US011773782B2

(12) United States Patent
Johnson et al.

(10) Patent No.: US 11,773,782 B2
(45) Date of Patent: Oct. 3, 2023

(54) GAS TURBINE ENGINES HAVING CRYOGENIC FUEL SYSTEMS

(71) Applicant: RTX Corporation, Farmington, CT (US)

(72) Inventors: Steven B. Johnson, Marlborough, CT (US); Andrew J. Murphy, Old Saybrook, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/132,080

(22) Filed: Dec. 23, 2020

(65) Prior Publication Data

US 2022/0195928 A1   Jun. 23, 2022

(51) Int. Cl.
| F02C 7/224 | (2006.01) |
| F02C 3/22 | (2006.01) |
| F02C 7/141 | (2006.01) |
| F02C 7/16 | (2006.01) |

(52) U.S. Cl.
CPC ............... *F02C 7/224* (2013.01); *F02C 3/22* (2013.01); *F02C 7/141* (2013.01); *F02C 7/16* (2013.01); *F05D 2260/213* (2013.01); *F05D 2260/232* (2013.01)

(58) Field of Classification Search
CPC .... F02C 7/16; F02C 7/32; F02C 7/141; F02C 7/224; F02C 3/22; F05D 2260/213; F01K 25/005
See application file for complete search history.

(56) References Cited

U.S. PATENT DOCUMENTS

| 3,740,949 | A | 6/1973 | Wolf et al. | |
| 7,117,663 | B2 | 10/2006 | Knapp | |
| 7,555,893 | B2 | 7/2009 | Okai et al. | |
| 8,205,827 | B2 | 1/2012 | Kerrebrock et al. | |
| 11,383,852 | B2* | 7/2022 | Razak | F02C 3/22 |
| 2008/0250792 | A1* | 10/2008 | Wang | F02C 7/275 60/778 |
| 2014/0297155 | A1* | 10/2014 | Chen | F02C 9/26 701/100 |
| 2015/0337730 | A1* | 11/2015 | Kupiszewski | F02C 7/16 60/39.465 |

(Continued)

OTHER PUBLICATIONS

G. Daniel Brewer, "Hydrogen Aircraft Technology," CRC Press, Inc., Chapters 1-4 and 6, 1991. (Year: 1991).*

(Continued)

*Primary Examiner* — Scott J Walthour
*Assistant Examiner* — David P. Olynick
(74) *Attorney, Agent, or Firm* — CANTOR COLBURN LLP (57) ABSTRACT

Turbine engine systems and aircraft having such systems are described. The turbine engine systems include a combustor arranged along a core flow path of the turbine engine, a drive shaft having at least a compressor section and a turbine section coupled thereto, a cryogenic fuel tank configured to supply a fuel to the combustor, and an expansion turbine mechanically coupled to the drive shaft, the expansion turbine configured to receive fuel from the cryogenic fuel tank and expand said fuel, wherein expansion of said fuel by the expansion turbine drives rotation of the expansion turbine to provide power input to the drive shaft.

17 Claims, 4 Drawing Sheets

(56) References Cited

U.S. PATENT DOCUMENTS

2016/0123226 A1* 5/2016 Razak ................. F02C 7/18
                                              60/39.15
2020/0025081 A1* 1/2020 Dyer .................. F02C 7/236

OTHER PUBLICATIONS

R. C. Mulready, "Liquid Hydrogen Engines," Chapter 5 in "Technology and Uses of Liquid Hydrogen," edited by R. B. Scott, W. H. Denton and C. M. Nicholls, Pergamon Press, 1964. (Year: 1964).*
American Astronautical Society History Series, vol. 13, Stephen E. Doyle, editor, Part 3, Chapter 4: "Space Shuttle Main Engine, The FirstTen Years," by Robert E. Biggs, pp. 69-122. Copyright© 1992 by American Astronautical Society. (Year: 1992).*
Extended European Search Report dated May 25, 2022, Application No. 21216172.3, 27 pages.

\* cited by examiner

GAS TURBINE ENGINES HAVING CRYOGENIC FUEL SYSTEMS

TECHNICAL FIELD

The present disclosure relates generally to gas turbine engines, and more specifically to employing cryogenic fuel systems and related systems with gas turbine engines.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, liquid fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of liquid, compressed, or supercritical hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF SUMMARY

According to some embodiments, turbine engine systems are provided. The turbine engine systems include a combustor arranged along a core flow path of the turbine engine, a drive shaft having at least a compressor section and a turbine section coupled thereto, a cryogenic fuel tank configured to supply a fuel to the combustor, and an expansion turbine mechanically coupled to the drive shaft, the expansion turbine configured to receive fuel from the cryogenic fuel tank and expand said fuel, wherein expansion of said fuel by the expansion turbine drives rotation of the expansion turbine to provide power input to the drive shaft.

In addition to one or more of the features described above, or as an alternative, embodiments of the turbine engine systems may include that the drive shaft comprises a low spool and a high spool and the expansion turbine is mechanically coupled to the low spool.

In addition to one or more of the features described above, or as an alternative, embodiments of the turbine engine systems may include that the fuel is one of liquid hydrogen and liquid methane.

In addition to one or more of the features described above, or as an alternative, embodiments of the turbine engine systems may include that the expansion turbine is configured to impart work to the drive shaft during expansion of the fuel.

In addition to one or more of the features described above, or as an alternative, embodiments of the turbine engine systems may include a flow supply line fluidly connecting the cryogenic fuel tank to the combustor with the expansion turbine arranged between the cryogenic fuel tank and the combustor along the flow supply line.

In addition to one or more of the features described above, or as an alternative, embodiments of the turbine engine systems may include a waste heat-heat exchanger arranged downstream of the combustor along a core flow path, wherein the waste heat-heat exchanger is arranged along the flow supply line and configured to heat the fuel.

In addition to one or more of the features described above, or as an alternative, embodiments of the turbine engine systes may include that the waste heat-heat exchanger is arranged upstream of the expansion turbine along the flow supply line.

In addition to one or more of the features described above, or as an alternative, embodiments of the turbine engine systems may include a power electronics cooling heat exchanger arranged along the flow supply line between the cryogenic fuel tank and the expansion turbine.

In addition to one or more of the features described above, or as an alternative, embodiments of the turbine engine systems may include a supplemental cooling heat exchanger arranged along the fuel supply line and configured to cool at least one of engine oil, environmental control system fluids, pneumatic off-takes, and cooled cooling air fluids.

In addition to one or more of the features described above, or as an alternative, embodiments of the turbine engine systems may include at least one flow controller arranged along the flow supply line and configured to control a flow of fuel through the fuel supply line.

In addition to one or more of the features described above, or as an alternative, embodiments of the turbine engine systems may include a compressor section operably coupled to the drive shaft and a turbine section operably coupled to the drive shaft.

In addition to one or more of the features described above, or as an alternative, embodiments of the turbine engine systems may include that a fan and a gear system operably coupled to the drive shaft and configured to drive rotation of the fan.

In addition to one or more of the features described above, or as an alternative, embodiments of the turbine engine systems may include a fan operably coupled to the drive shaft.

According to some embodiments, aircraft engine systems are provided. The aircraft engine systems include a combustor arranged along a core flow path of the aircraft engine, a drive shaft having at least a compressor section and a turbine section coupled thereto, a fan operably coupled to the draft shaft, a cryogenic fuel tank configured to supply a fuel to the combustor, and an expansion turbine mechanically coupled to the drive shaft, the expansion turbine configured to receive fuel from the cryogenic fuel tank and expand said fuel, wherein expansion of said fuel by the expansion turbine drives rotation of the expansion turbine to provide power input to the drive shaft.

In addition to one or more of the features described above, or as an alternative, embodiments of the aircraft engine systems may include that the drive shaft comprises a low spool and a high spool and the expansion turbine is mechanically coupled to the low spool.

In addition to one or more of the features described above, or as an alternative, embodiments of the aircraft engine systems may include that the fuel is one of liquid hydrogen and liquid methane.

In addition to one or more of the features described above, or as an alternative, embodiments of the aircraft engine systems may include that the expansion turbine is configured to impart work to the drive shaft during expansion of the fuel.

In addition to one or more of the features described above, or as an alternative, embodiments of the aircraft engine systems may include a flow supply line fluidly connecting the cryogenic fuel tank to the combustor with the expansion turbine arranged between the cryogenic fuel tank and the combustor along the flow supply line.

In addition to one or more of the features described above, or as an alternative, embodiments of the aircraft engine systems may include that the combustor, the drive shaft, the compressor section, and the turbine section are arranged as a turboshaft engine or a turboprop engine.

In addition to one or more of the features described above, or as an alternative, embodiments of the aircraft engine systems may include that the combustor, the drive shaft, the compressor section, and the turbine section are arranged as a turbofan engine.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
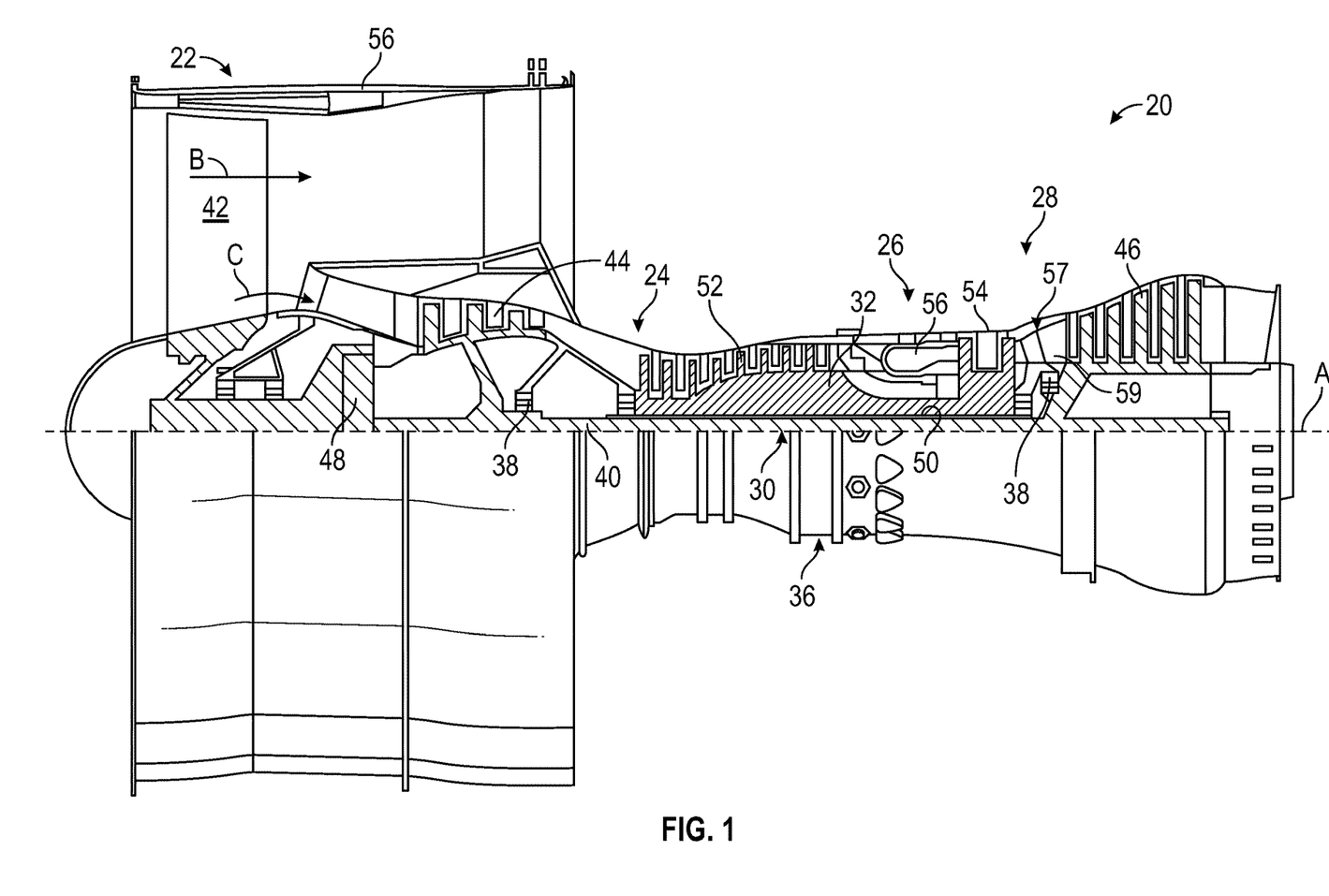
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined in a fan case 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7°R)]^0.5. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy, and can be a large source of inefficiency in gas turbine engines.

Figure 2:
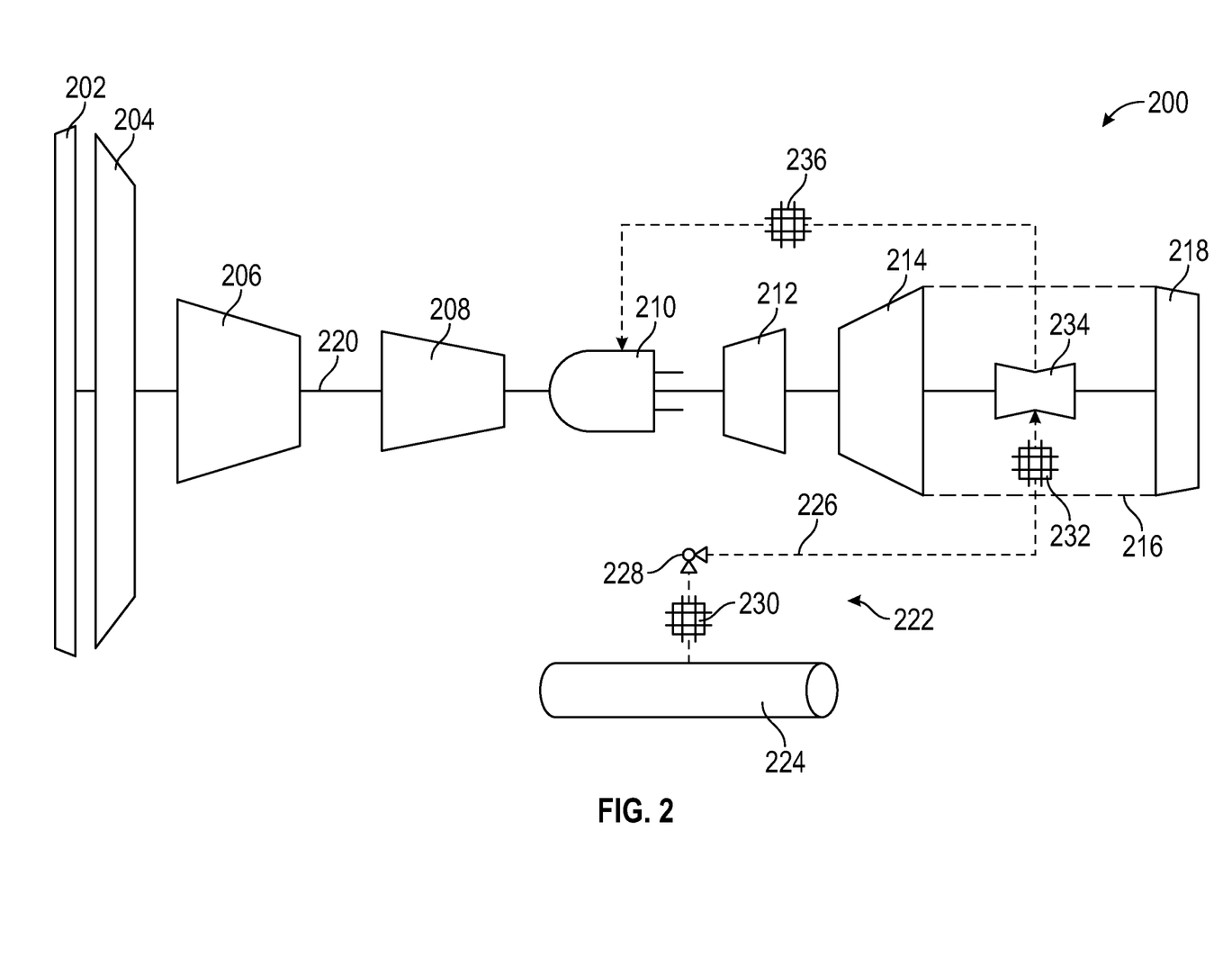
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above, but is configured to employ a non-hydrocarbon fuel source, such as liquid/compressed/supercritical hydrogen and/or methane, or other types of cryogenic fuels, as will be appreciated by those of skill in the art. The turbine engine system 200 includes an inlet 202, a fan 204, a low pressure compressor 206, a high pressure compressor 208, a combustor 210, a high pressure turbine 212, a low pressure turbine 214, a core nozzle 216, and an outlet 218. A core flow path is defined through, at least, the compressor 206, 208, the turbine 212, 214, and the combustor sections 210. The compressor 206, 208, the turbine 212, 214, and the fan 204 are arranged along a shaft 220.

As shown, the turbine engine system 200 includes a cryogenic fuel system 222. The cryogenic fuel system 222 is configured to supply a fuel from a cryogenic fuel tank 224 to the combustor 210. In this illustrative embodiment, the fuel may be supplied from the cryogenic fuel tank 224 to the combustor 210 through a fuel supply line 226. The fuel supply line 226 may be controlled by a flow controller 228 (e.g., pump(s), valve(s), or the like). The flow controller 228 may be configured to control a flow through the fuel supply line 226 based on various criteria as will be appreciated by those of skill in the art. For example, various control criteria can include, without limitation, target flow rates, target turbine output, cooling demands at one or more heat exchangers, target flight envelopes, etc. As shown, between the cryogenic fuel tank 222 and the flow controller 228 may be an optional power electronics cooling heat exchanger 230. The power electronics cooling heat exchanger 230 may receive the cryogenic fuel directly from the cryogenic fuel tank 222 as a first fluid and a power electronics working fluid for power electronics of the turbine engine system 200 (or other aircraft power electronics) as a second fluid. A relatively hot power electronics working fluid can pass through the power electronics cooling heat exchanger 230 and heat may be transferred into the cryogenic fuel. This may serve, in some configurations, to begin raising a temperature of the cryogenic fuel to a desired temperature for efficient combustion in the combustor 210.

When the fuel is directed along the flow supply line 226, the fuel will pass through a core flow path heat exchanger 232 (e.g., an exhaust waste heat recovery heat exchanger). The core flow path heat exchanger 232 is arranged in the core flow path downstream of the combustor 210, and in some embodiments, downstream of the low pressure turbine 214. In this illustrative embodiment, the core flow path heat exchanger 232 is arranged downstream of the low pressure turbine 214 and at or proximate the core nozzle 216 upstream of the outlet 218. As the fuel passes through the core flow path heat exchanger 232, the fuel will pick up heat from the exhaust of the turbine engine system 200. As such, the temperature of the cryogenic fuel will be increased.

The heated fuel will then be passed into an expansion turbine 234. As the fuel passes through the expansion turbine 234 the fuel will be expanded. The process of passing the fuel through the expansion turbine 234 will cause a phase change from liquid to gas and/or warm the liquid fuel and/or further expand gaseous fuel, which is aided by one or more heat exchangers along the fuel supply line 226. The expanded fuel may then pass through an optional supplemental heating heat exchanger 236. The supplemental heating heat exchanger 236 is configured to receive the heated (but potentially still relatively cold) fuel as a first fluid and as the second fluid may receive one or more aircraft system fluids, such as, without limitation, engine oil, environmental control system fluids, pneumatic off-takes, or cooled cooling air fluids. As such, the fuel will be heated as the other fluid may be cooled. The fuel will then be injected into the combustor 210 through one or more fuel injectors, as will be appreciated by those of skill in the art. Because the fuel is heated from the cryogenic state in the cryogenic fuel tank 224 through the various mechanisms along the flow supply line 226, combustion efficiency may be improved.

In accordance with embodiments of the present disclosure, the expansion turbine 234 for the cryogenic fuel is arranged along and driven by the shaft 220. The shaft 220 may be a two-spool shaft system, such as described with respect to FIG. 1, having a low spool and a high spool. In some embodiments of the present disclosure, the expansion turbine 234 is configured to be driven by the low spool of the two-spool shaft system. In such configurations, the expansion of the cryogenic fuel within the expansion turbine 234 can be used to supplement or augment the cycle of the shaft 220. That is, the expansion within the expansion turbine 234 can provide additional power input to the shaft 220 by mechanically tying the expansion turbine 234 to the shaft 220 (e.g., low spool shaft). The shaft 220 may be a shaft of a turbo shaft engine configuration or a shaft of a turbo fan engine configuration, as will be appreciated by those of skill in the art. In some embodiments, the expansion turbine 234 may be operably coupled to the shaft 220 through a gearbox or other geared system.

Figure 3:
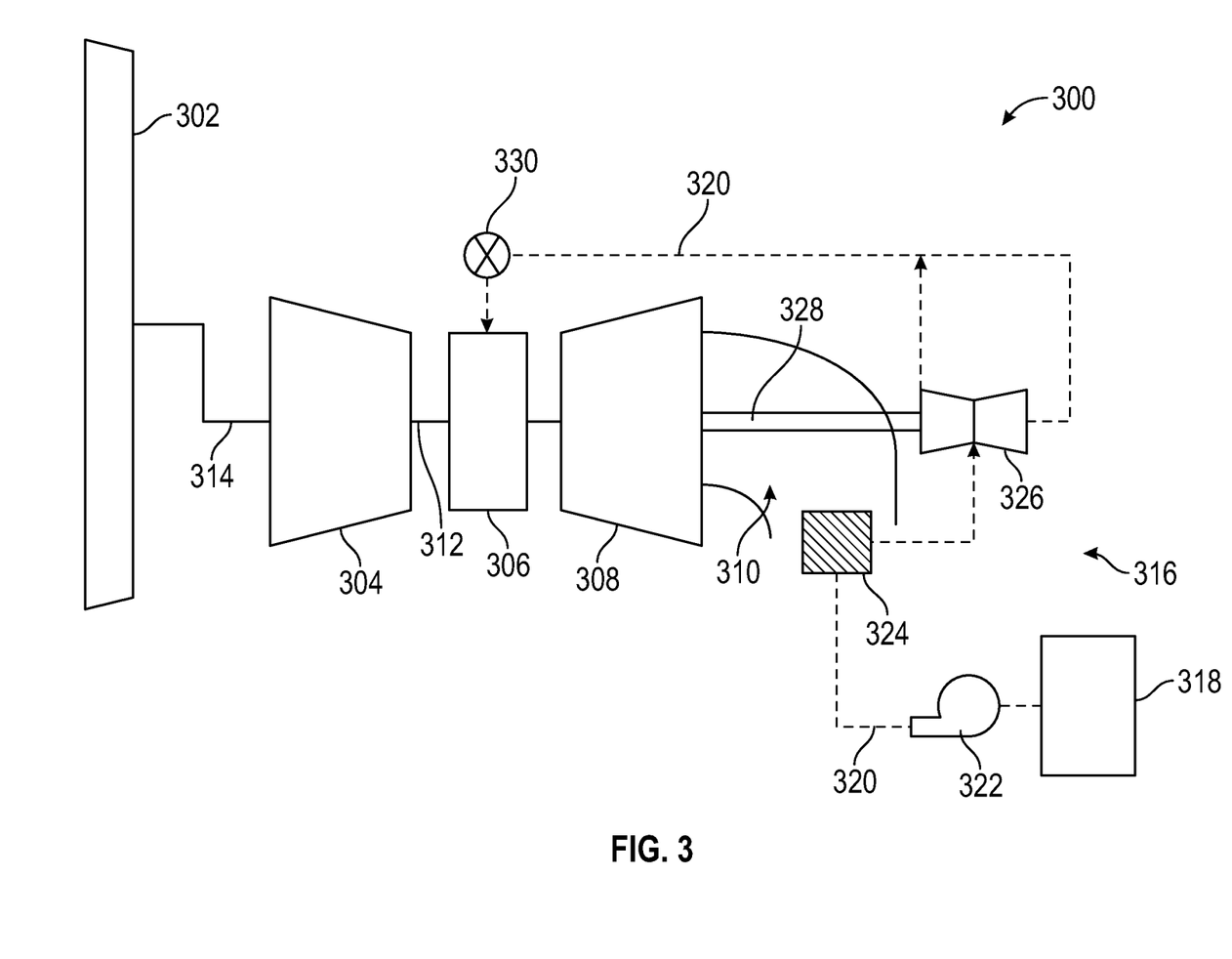
FIG. 3 is a schematic illustration of a turboshaft or turboprop engine in accordance with an embodiment of the present disclosure.

Turning now to FIG. 3, a schematic illustration of a turboshaft engine or turboprop 300 in accordance with an embodiment of the present disclosure is shown. The turboshaft or turboprop engine 300 may be powered by combusting a fuel that is stored at cryogenic temperatures. The turboshaft or turboprop engine 300 includes a propeller 302, a compressor section 304, a combustor section 306, a turbine section 308, and an outlet 310. The compressor section 304 and the turbine section 308, at least, are arranged along a drive shaft 312. The drive shaft 312 is operably connected to a gear system 314 that is configured to drive rotation of the propeller 302. In some embodiments or configurations, the gear system 314 may be a gearbox or the like.

The turboshaft or turboprop engine 300 includes a cryogenic fuel system 316. The cryogenic fuel system 316 is configured to supply a fuel from a cryogenic fuel tank 318 to the combustor section 306. In this illustrative embodiment, the fuel may be supplied from the cryogenic fuel tank 318 to the combustor section 306 through a fuel supply line 320. The fuel supply line 320 may be controlled by a flow controller 322 (e.g., pump(s), valve(s), or the like).

When the fuel is directed along the flow supply line 320, the fuel will pass through a core flow path heat exchanger 324 (e.g., an exhaust waste heat recovery heat exchanger). The core flow path heat exchanger 324 is arranged in the core flow path downstream of the combustor 306, and in some embodiments, downstream of the turbine section 308. In this illustrative embodiment, the core flow path heat exchanger 324 is arranged within the outlet 310 of the turboshaft or turboprop engine 300. As the fuel passes through the core flow path heat exchanger 324, the fuel will pick up heat from the exhaust of the turboshaft or turboprop engine 300. As such, the temperature of the cryogenic fuel will be increased.

The heated fuel will then be passed into an expansion turbine 326. As the fuel passes through the expansion turbine 326 the fuel will be expanded. The process of passing the fuel through the expansion turbine 326 will cause a phase change from liquid to gas and/or warm the liquid fuel and/or further expand gaseous fuel, which is aided by one or more heat exchangers along the fuel supply line 320. The fuel will then be injected into a combustor of the combustor section 306 through one or more fuel injectors, as will be appreciated by those of skill in the art. Because the fuel is heated from the cryogenic state in the cryogenic fuel tank 318 through the various mechanisms along the flow supply line 320, combustion efficiency may be improved.

In accordance with embodiments of the present disclosure, the expansion turbine 324 for the cryogenic fuel is arranged along and driven by the shaft 312 of the turboshaft or turboprop engine 300. As shown, an expansion shaft 328 may be operably coupled to the shaft 312 of the turboshaft or turboprop engine 300. In such configurations, the expansion of the cryogenic fuel within the expansion turbine 326 can be used to supplement or augment the cycle of the turboshaft or turboprop engine 300. That is, the expansion within the expansion turbine 326 can provide additional power input to the shaft 312 of the turboshaft or turboprop engine 300 by mechanically tying the expansion turbine 326 to the shaft 312 of the turboshaft or turboprop engine 300.

In this embodiment, a secondary flow controller 330 (e.g., valves and/or pumps) may be arranged downstream from the expansion turbine 326. The secondary flow controller 330 may be configured to control a fuel input into the combustor(s) of the combustor section 306. Thrust generated by the turboshaft or turboprop engine 300 can be controlled, for example, through a combination of pitch of the propeller 302, throttling the supply of liquid fuel to the expansion turbine 326 (through control of the flow controller 322), and throttling gaseous fuel to the combustor (through the secondary flow controller 330). The supply of fuel to the expansion turbine 326 can enable power to be input to the shaft 312 (e.g., directly or through a gearbox) through work extracted during the expansion process.

Figure 4:
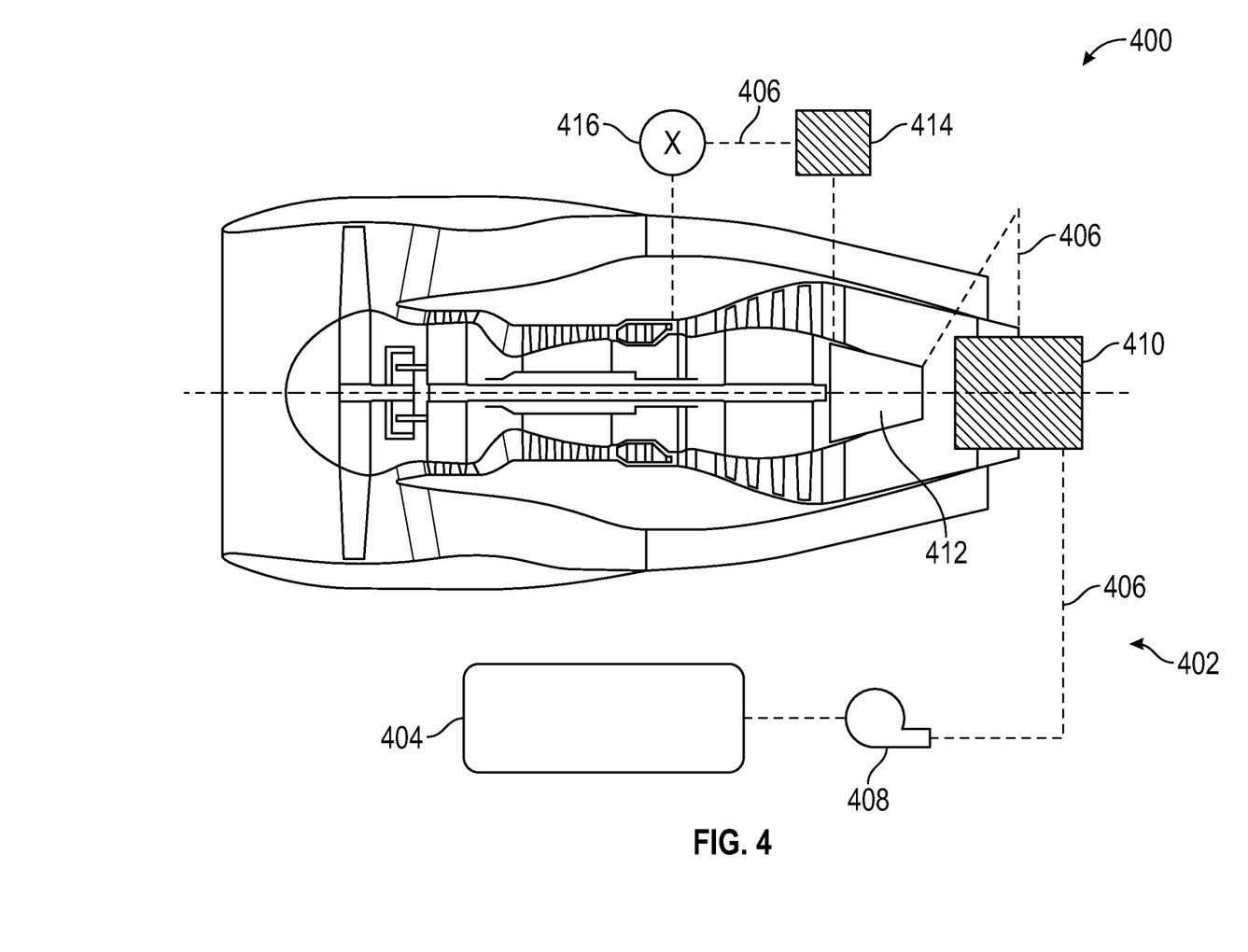
FIG. 4 is a schematic illustration of a turbofan engine in accordance with an embodiment of the present disclosure.

Turning now to FIG. 4, a schematic illustration of a turbofan engine 400 in accordance with an embodiment of the present disclosure is shown. The turbofan engine 400 may be powered by combusting a fuel that is stored at cryogenic temperatures. The turbofan engine 400 includes a fan section, a compressor section, a combustor section, a turbine section, and an outlet, similar to that shown and described above. The fan section, the compressor section, and the turbine section, at least, are arranged along a drive shaft. The turbofan engine 400 includes a cryogenic fuel system 402. The cryogenic fuel system 402 is configured to supply a fuel from a cryogenic fuel tank 404 to the combustor section. In this illustrative embodiment, the fuel may be supplied from the cryogenic fuel tank 404 to the combustor section through a fuel supply line 406. The fuel supply line 406 may be controlled by a flow controller 408 (e.g., pump(s), valve(s), or the like).

When the fuel is directed along the flow supply line 406, the fuel will pass through a core flow path heat exchanger 410 (e.g., an exhaust waste heat recovery heat exchanger). The core flow path heat exchanger 410 is arranged in the core flow path downstream of the combustor section, and in some embodiments, downstream of the turbine section. In this illustrative embodiment, the core flow path heat exchanger 410 is arranged within the outlet of the turbofan engine 400. As the fuel passes through the core flow path heat exchanger 410, the fuel will pick up heat from the exhaust of the turbofan engine 400. As such, the temperature of the cryogenic fuel will be increased.

The heated fuel will then be passed into an expansion turbine 412. As the fuel passes through the expansion turbine 412 the fuel will be expanded. The process of passing the fuel through the expansion turbine 412 will cause a phase change from liquid to gas and/or warm the liquid fuel and/or further expand gaseous fuel, which is aided by one or more heat exchangers along the fuel supply line 406. For example, in this illustrative embodiment, the expanded fuel may pass through an optional supplemental heating heat exchanger 414. The supplemental heating heat exchanger 414 is configured to receive the heated (but potentially still relatively cold) fuel as a first fluid and as the second fluid may receive one or more aircraft system fluids, such as, without limitation, engine oil, environmental control system fluids, pneumatic off-takes, or cooled cooling air fluids. As such, the fuel will be heated as the other fluid may be cooled. The fuel will then be injected into a combustor of the combustor section through one or more fuel injectors, as will be appreciated by those of skill in the art. Because the fuel is heated from the cryogenic state in the cryogenic fuel tank 404 through the various mechanisms along the flow supply line 406, combustion efficiency may be improved.

In accordance with embodiments of the present disclosure, the expansion turbine 412 for the cryogenic fuel is arranged along and driven by the shaft of the turbofan engine 400. In such configurations, the expansion of the cryogenic fuel within the expansion turbine 412 can be used to supplement or augment the cycle of the turbofan engine 400. That is, the expansion within the expansion turbine 412 can provide additional power input to the shaft of the turbofan engine 400 by mechanically tying the expansion turbine 412 to the shaft of the turbofan engine 400 (e.g., low spool shaft).

In this embodiment, a secondary flow controller 416 (e.g., a valve and/or pump) may be arranged downstream from the expansion turbine 412. The secondary flow controller 416 may be configured to control a fuel input into the combustor(s) of the combustor section. Thrust generated by the turbofan engine 400 can be controlled, for example, through a combination of throttling the supply of liquid fuel to the expansion turbine 412 (through control of the flow controller 408) and throttling gaseous fuel to the combustor (through the secondary flow controller 416). In some configurations, the expansion turbine 412 can be configured to add power to the low spool, which in turn can enable a reduction in the amount of fuel burned in the combustor. Such configurations can take advantage of energy stored in the cryogenic fuel that is released when the cryogenic fuel is expanded within the expansion turbine 412. Thrust is generally controlled by fan speed, and thus, in such configurations, a control can be implemented to throttle the fuel burned to hold the fan speed.

It is noted that in the configurations shown in FIGS. 2-4, specific arrangements of components are shown and described. However, it will be appreciated by those of skill in the art that various other arrangements are possible, without departing from the scope of the present disclosure. It is noted that one or more optional heat exchangers can provide various cooling to fluids of other engine and/or aircraft systems. For example, as described, a heat exchanger can be provided to cryogenically cool power electronics by the fuel, adding some heat to the fuel before recovering heat from another source in the turbine engine (e.g., a source along the core flow path, referred to herein as core flow path heat exchangers). As described, a heat exchanger can be provided to cool the engine oil, aircraft ECS needs, pneumatic off-takes, and/or cooled cooling air, downstream of the expansion turbine prior to being injected into the combustor. Alternatively, an aircraft ECS cooler heat exchanger could be arrange between the cryogenic power electronics cooler and the core flow path heat exchangers.

The engine oil cooler or cooled cooling air heat exchangers could alternatively be between the core flow path heat exchangers and expansion turbine. Additionally, it will be appreciated that the additional embodiments and configurations described below may also be rearranged and/or components may be combined from various embodiments to form a system not explicitly shown, but in line with the present disclosure and the various embodiments described herein. For example, one or more pumps for working fluids and/or fuels may be employed in the flow lines, as will be appreciated by those of skill in the art. As such, no specific or individual shown or described embodiment is to be limiting, but rather is provided for illustrative and explanatory purposes only.

In some embodiments, the flow controller of the systems may be configured to allow for a portion of the fuel to flow along one or more flow paths. In some such configurations, two or more separated flows of fuel may be recombined and mixed together prior to or at the point of entering the expansion turbine and/or the combustor. As such, a flow controller may be dynamically controlled to ensure a desired temperature of the fuel at the point of injection into the combustor of the turbine engine.

Advantageously, embodiments of the present disclosure are directed to improved turbine engine systems that employ non-hydrocarbon fuels at cryogenic temperatures. In accordance with some embodiments, the systems described herein may allow the cryogenic fuel to recover heat from various systems such as waste heat-heat exchangers, system component heat exchangers, and expansion turbines. Such expansion turbines, advantageously, may provide supplemental or augmentation to thrust generated by the engines. This may be achieved due to the liquid or cold fuel expanding within the expansion turbine, thus applying force to a shaft of the expansion turbine, which may be mechanically coupled to a shaft of the engine. This additional rotation can be used to generate additional thrust output from the engine.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A turbine engine system, comprising:
a combustor arranged along a core flow path of the turbine engine;
a drive shaft having at least a fan, a compressor section, and a turbine section coupled thereto, wherein the turbine section is rotationally driven by exhaust from the combustor, and the fan is rotationally driven through the drive shaft by the rotationally driven turbine section;
a cryogenic fuel tank configured to supply a fuel to the combustor;
an expansion turbine mechanically coupled to the drive shaft and arranged in the core flow path and downstream from the turbine section, the expansion turbine configured to receive fuel from the cryogenic fuel tank and expand said fuel, wherein expansion of said fuel by the expansion turbine drives rotation of the expansion turbine to provide power input to the drive shaft, wherein the expansion turbine is configured to supplement or augment rotation of the drive shaft;

a core flow path heat exchanger arranged along the core flow path downstream from the combustor, wherein the core flow path heat exchanger is a fuel-core flow heat exchanger;

a supplemental heating heat exchanger arranged separate from the core flow path, wherein the supplemental heating heat exchanger is a fuel-secondary fluid heat exchanger, wherein the secondary fluid is one of engine oil, environmental control system fluid, pneumatic off-take fluid, and cooled cooling air fluid; and a flow supply line fluidly connecting the cryogenic fuel tank to the combustor with the expansion turbine arranged between the cryogenic fuel tank and the combustor along the flow supply line, wherein the fuel is supplied from the cryogenic fuel tank, passed through the core flow heat exchanger, expanded in the expansion turbine, passed through the supplemental heating heat exchanger, and supplied into the combustor for combustion thereof.

2. The turbine engine system of claim 1, wherein the drive shaft comprises a low spool and a high spool and the expansion turbine is mechanically coupled to the low spool to augment rotation of the low spool.

3. The turbine engine system of claim 1, wherein the fuel is one of liquid hydrogen and liquid methane.

4. The turbine engine system of claim 1, wherein the expansion turbine is configured to impart work to the drive shaft during expansion of the fuel.

5. The turbine engine system of claim 1, wherein the core flow heat exchanger is a waste heat-heat exchanger that is arranged upstream of the expansion turbine along the flow supply line.

6. The turbine engine system of claim 1, further comprising a power electronics cooling heat exchanger arranged along the flow supply line between the cryogenic fuel tank and the expansion turbine.

7. The turbine engine system of claim 1, further comprising at least one flow controller arranged along the flow supply line and configured to control a flow of fuel through the fuel supply line.

8. The turbine engine system of claim 1, further comprising:
a gear system operably coupled to the drive shaft and configured to drive rotation of the fan.

9. An aircraft engine system comprising:
a combustor arranged along a core flow path of the aircraft engine system;
a drive shaft having at least a compressor section and a turbine section coupled thereto, wherein the turbine section is rotationally driven by exhaust from the combustor;
a fan operably coupled to the drive shaft;
a cryogenic fuel tank configured to supply a fuel to the combustor;
an expansion turbine mechanically coupled to the drive shaft and arranged in the core flow path and downstream from the turbine section, the expansion turbine configured to receive fuel from the cryogenic fuel tank and expand said fuel, wherein expansion of said fuel by the expansion turbine drives rotation of the expansion turbine to provide power input to the drive shaft, wherein the expansion turbine is configured to supplement or augment rotation of the drive shaft;

a core flow path heat exchanger arranged along the core flow path downstream from the combustor, wherein the core flow path heat exchanger is a fuel-core flow heat exchanger;

a supplemental heating heat exchanger arranged separate from the core flow path, wherein the supplemental heating heat exchanger is a fuel-secondary fluid heat exchanger, wherein the secondary fluid is one of engine oil, environmental control system fluid, pneumatic off-take fluid, and cooled cooling air fluid; and a flow supply line fluidly connecting the cryogenic fuel tank to the combustor with the expansion turbine arranged between the cryogenic fuel tank and the combustor along the flow supply line, wherein the fuel is supplied from the cryogenic fuel tank, passed through the core flow heat exchanger, expanded in the expansion turbine, passed through the supplemental heating heat exchanger, and supplied into the combustor for combustion thereof.

10. The aircraft engine system of claim 9, wherein the drive shaft comprises a low spool and a high spool and the expansion turbine is mechanically coupled to the low spool to augment rotation of the low spool.

11. The aircraft engine system of claim 9, wherein the fuel is one of liquid hydrogen and liquid methane.

12. The aircraft engine system of claim 9, wherein the expansion turbine is configured to impart work to the drive shaft during expansion of the fuel.

13. The aircraft engine system of claim 9, wherein the combustor, the drive shaft, the compressor section, and the turbine section are arranged as a turboshaft engine or a turboprop engine.

14. The aircraft engine system of claim 9, wherein the combustor, the drive shaft, the compressor section, and the turbine section are arranged as a turbofan engine.

15. The turbine engine system of claim 1, wherein thrust generated by the turbine engine system is controlled through throttling of the supply of fuel to the expansion turbine.

16. The aircraft engine system of claim 9, wherein the core flow heat exchanger is a waste heat-heat exchanger arranged downstream of the combustor along the core flow path.

17. The aircraft engine system of claim 9, further comprising a power electronics cooling heat exchanger arranged along the flow supply line between the cryogenic fuel tank and the expansion turbine.

* * * * *